US006986586B2

(12) United States Patent
Martinez, Sr.

(10) Patent No.: US 6,986,586 B2
(45) Date of Patent: Jan. 17, 2006

(54) THIN FILM MIRROR

(76) Inventor: Eugene Martinez, Sr., 3 Woodbine Rd., Irvington, NY (US) 10533

( * ) Notice: Subject to any disclaimer, the term of this patent is extended or adjusted under 35 U.S.C. 154(b) by 22 days.

(21) Appl. No.: 10/668,391

(22) Filed: Sep. 23, 2003

(65) Prior Publication Data
US 2005/0063077 A1 Mar. 24, 2005

(51) Int. Cl.
G02B 5/08 (2006.01)
(52) U.S. Cl. ............ 359/847; 248/466; 359/871
(58) Field of Classification Search ......... 359/846, 359/847, 871, 872, 879, 819; 248/466
See application file for complete search history.

(56) References Cited
U.S. PATENT DOCUMENTS
5,841,595 A * 11/1998 Martinez, Sr. ............ 359/847

* cited by examiner

Primary Examiner—Euncha P. Cherry

(57) ABSTRACT

The thin-film mirror includes a pan-shaped housing having a pan surface and a hollow wall bordering the pan surface. The hollow wall has a mounting surface for thin reflecting film, which mounting surface is stepped above the pan surface. The hollow wall has an open portion opposite the mounting surface and accommodates a reinforcing member that rigidities the pan-shaped housing. A thin reflecting film that spans the pan surface is secured to the film mounting surface. The pan-shaped housing is a miterless one-piece structure which can be in the form of a trapezoid. Hollow fillets can be provided at the acute angle corners of the trapezoid. The fillets constitute an additional mounting surface portion for the thin reflecting film and are formed such that no corner of the mounting surface has an acute angle.

23 Claims, 12 Drawing Sheets

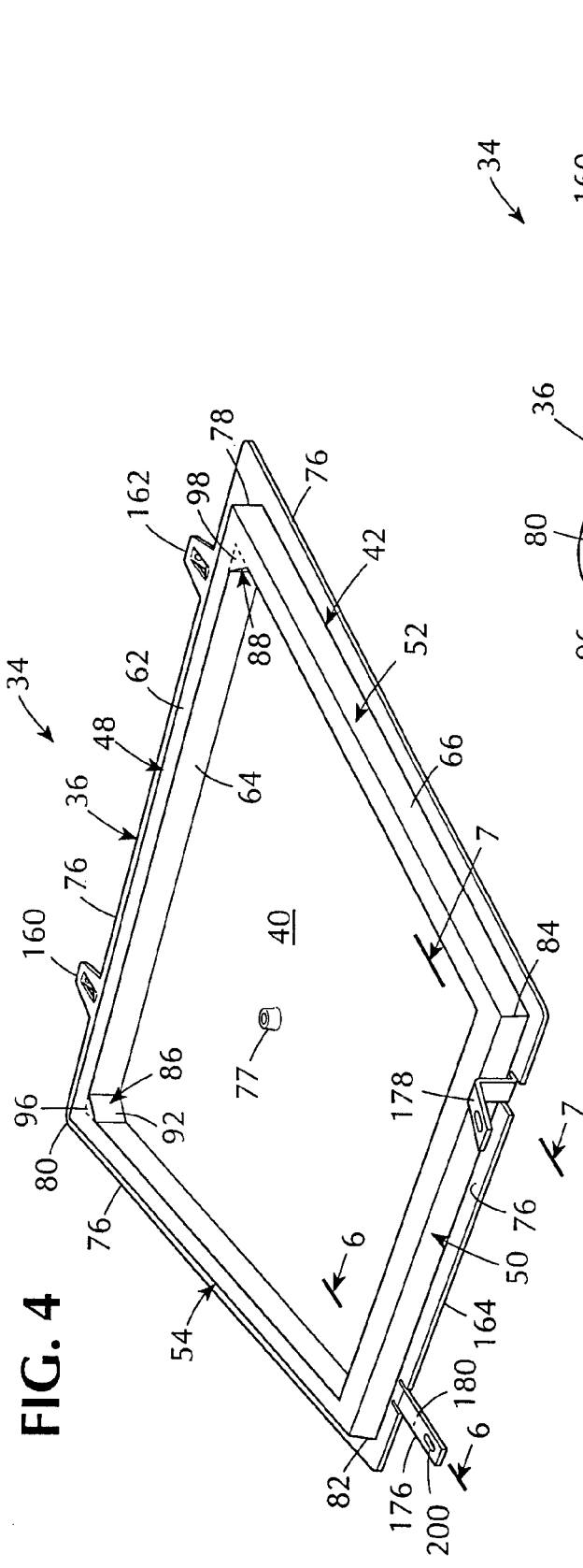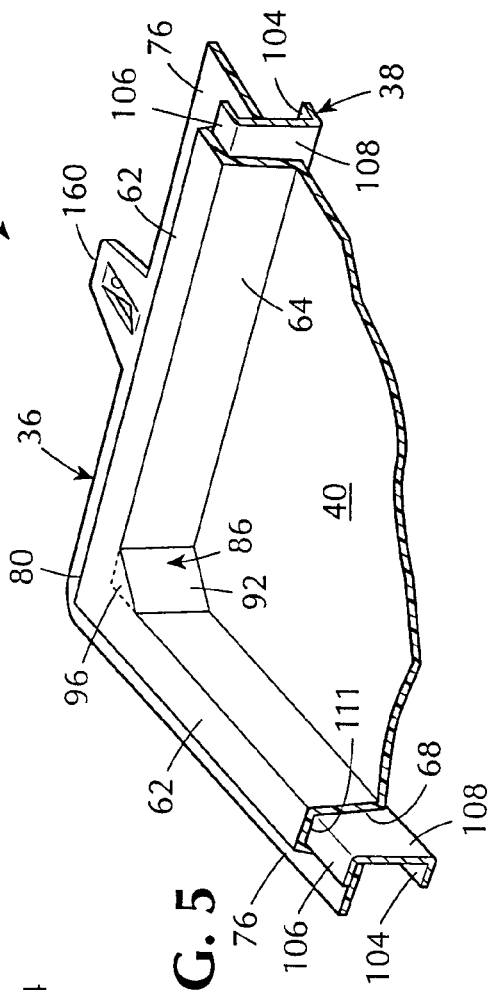

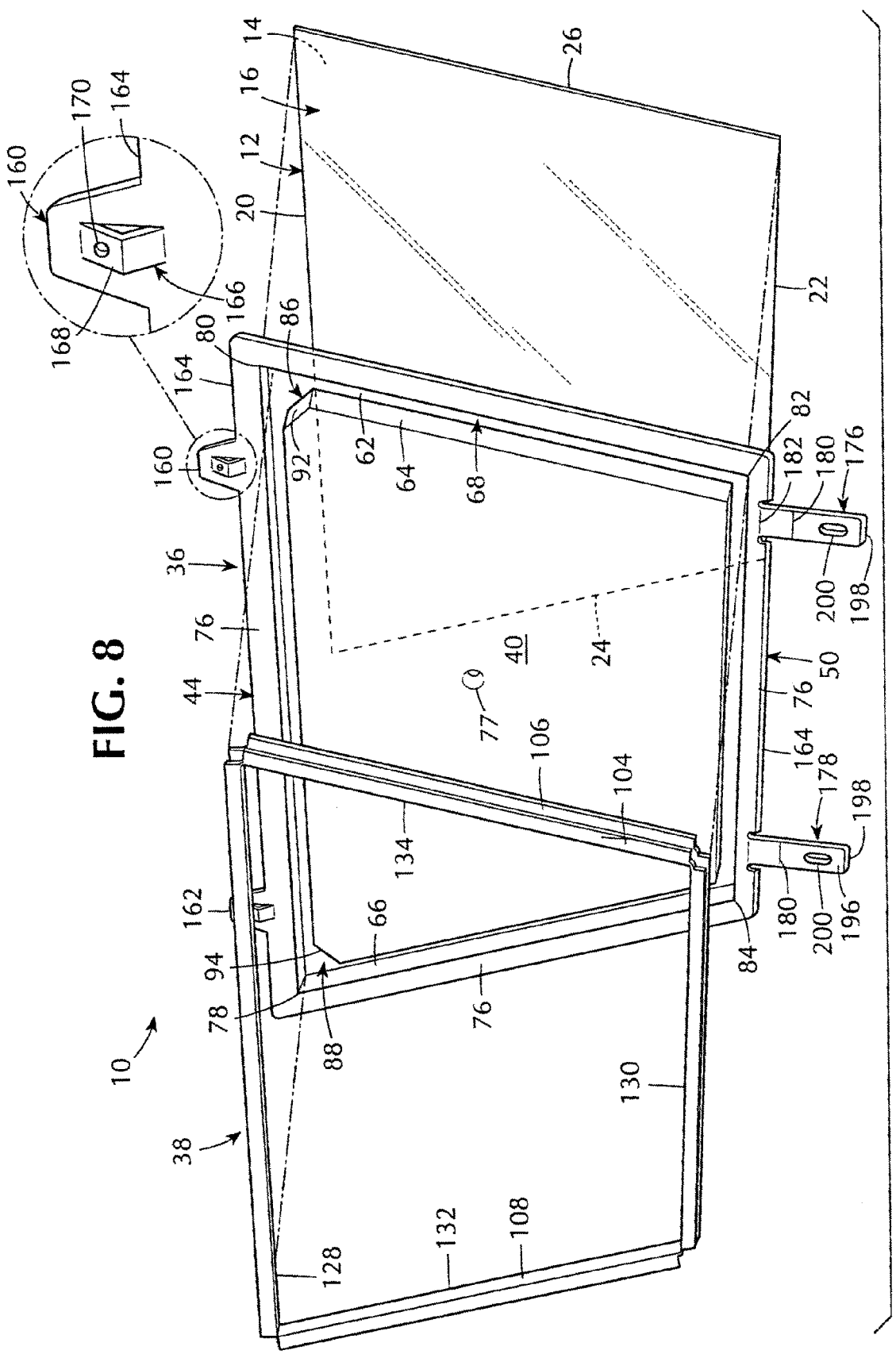

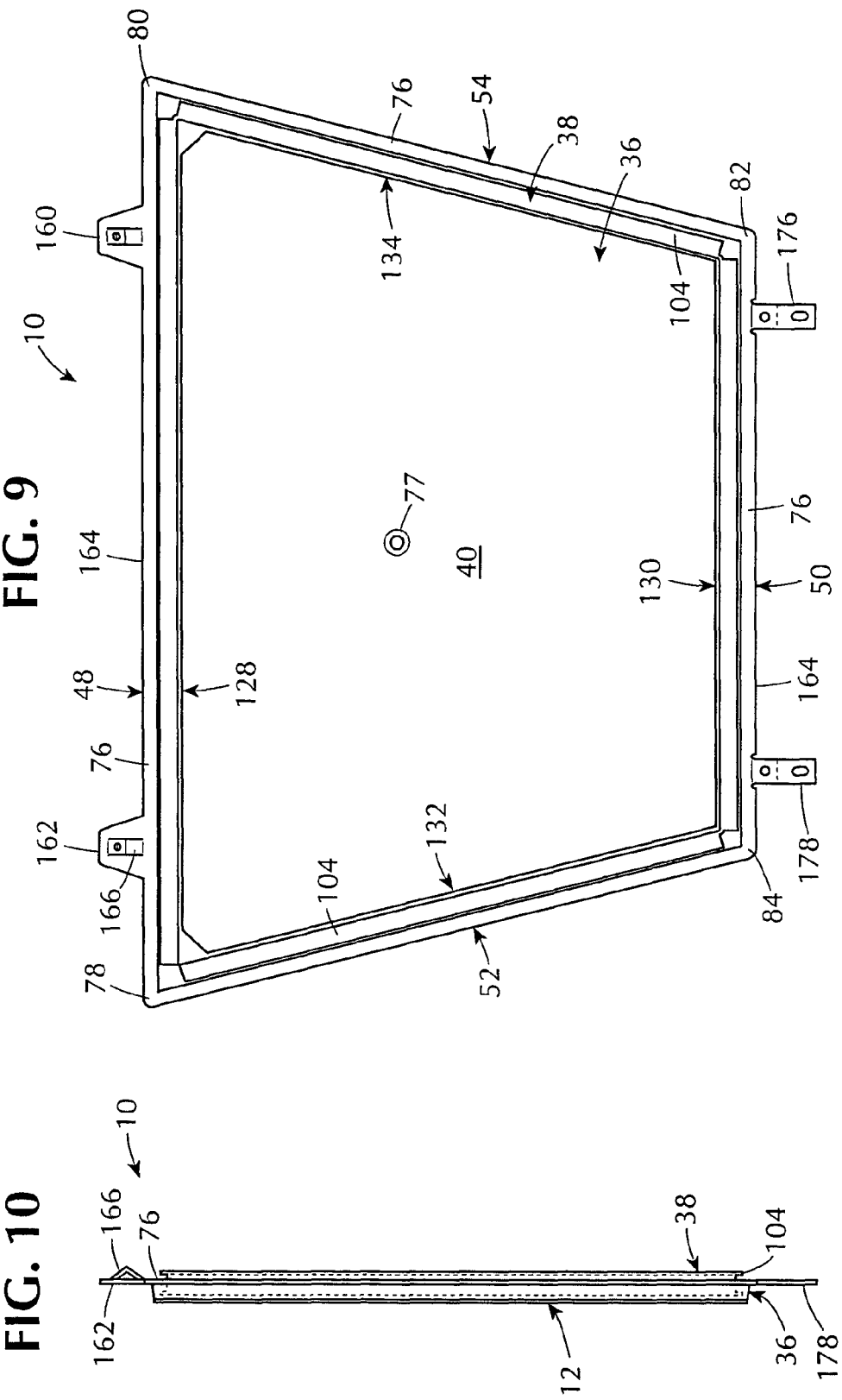

THIN FILM MIRROR

BACKGROUND OF THE INVENTION

This invention relates to thin-film mirrors, and more particularly to a thin-film mirror having a novel support frame for supporting the thin reflecting film of the thin-film mirror, and a thin-film mirror with a novel monocoque construction.

Mirrors are often used in optical systems to fold the optical path, such as the distance between a projector lens and a rear projection screen in a television (TV), in order to compact the size of the optical system and permit a corresponding reduction in cabinet size for the TV. Glass has long been used as the substrate for the reflective material of a mirror, which reflective material is generally a coating of aluminum or silver. The reflective material is usually applied to the front surface of the glass in an optical system to avoid having the projected light rays pass through the thickness of the glass.

As the size of rear projection TV screens increase, the size of reflecting mirrors must also increase proportionally. Relatively large glass mirrors have significant weight. It has thus been customary to make large mirrors for rear projection televisions as thin as possible in order to minimize the weight. However thin glass mirrors are likely to fracture in drop tests that have become a standard requirement for TV manufacturers. Consistent flatness of the mirror reflecting surface is also difficult to obtain with large thin glass mirrors because of the flexibility of the thin glass.

Thin-film mirrors solve many of the problems associated with glass mirrors, such as weight and breakage problems, and are therefore a desirable replacement for glass mirrors in rear projection TV systems.

The term "thin-film mirror" refers to a glassless mirror comprising a thin reflecting film in the form of a plastic sheet with a layer of vacuum deposited reflective metal on one surface, and a supporting frame for supporting the thin reflective film.

Thin-film mirrors are inherently flat because of the flatness of the film substrate. Thus thin-film mirrors have become the mirror of choice by numerous manufacturers of large screen, rear projection TV sets.

Examples of different constructions and constituents of thin-film mirrors are found in U.S. Pat. Nos. 3,180,220; 3,434,181; 3,552,835; 3,608,179; 3,880,500; 5,247,395; and 6,065,843 the disclosures of which are incorporated herein by reference.

In manufacturing known thin-film mirrors it is essential that the film support surface at the corner miter joints of the film support frame be in exactly the same plane to provide a smooth surface for securement of the thin-film mirror to the film support frame. In some instances the film support surface of one joining member at the corner miter joint is inadvertently stepped higher or lower than the film support surface of the adjacent joining member at the corner miter joint. In other instances there may be a slight gap or displacement between adjacent joining members at the corner miter joint.

If a step or gap is present at a corner miter joint where the thin reflecting film is adhered a "crow's foot" wrinkle is likely to form at-the corner portion of the film. Film wrinkling that originates at a corner miter joint will usually radiate from the corner of the thin reflecting film into the optical reflecting area of the thin-film mirror thus causing a distortion of the reflected image on the screen.

I have found that when the mitered corner joint of a mirror frame has an obtuse corner angle, and there are no steps or gaps at the corner miter joint, the thin reflecting film adhered at the corner tensions or shrinks with little or no wrinkling in the mitered corner joint. I have also found that when the mitered corner joint of a mirror frame has an acute corner angle, and there are no steps or gaps at the corner miter joint, the thin reflecting film adhered at the corner tends to develop a "crow's foot" wrinkle in the mitered corner joint.

It is thus desirable to provide a thin-film mirror with no gaps or steps at the corner surfaces of a support frame where the thin film is adhered and a support frame with no acute angles at the corner surfaces where the thin film is adhered. It is also desirable to provide a monocoque construction for a thin-film mirror that eliminates gaps and steps at the corner surfaces where the thin film is adhered.

OBJECTS AND SUMMARY OF THE INVENTION

Among the several objects of the invention may be noted the provision of a novel thin-film mirror having a support frame with no gaps or steps at the corner film mounting surfaces where the thin film is adhered, a thin-film mirror having a support frame with no acute angles at the corner film mounting surfaces where the thin film is adhered, a thin-film mirror having a monocoque construction that eliminates gaps or steps at the corner film mounting surfaces where the thin film is adhered, a thin-film mirror having a one-piece support housing with no gaps or steps at the corner film mounting surfaces where the thin film is adhered, a thin-film mirror having a one-piece support housing with no acute angles at the corner film mounting surfaces where the thin film is adhered, a thin-film mirror that substantially eliminates wrinkling of the thin reflecting film at the corner film mounting surfaces of the support frame even when the corner angle of the support frame is an acute angle, a thin-film mirror having a miterless one-piece housing for supporting the thin reflecting film of the thin-film mirror, a thin-film mirror having a foldable one-piece reinforcing member for the support housing, a thin-film mirror having a support frame that enables a plurality of thin-film mirrors to be stacked without causing damage to the optical reflecting area, a thin-film mirror having a support frame that includes integrally formed hangers for suspending the support frame from a support surface or other support structure, and a method of substantially eliminating wrinkling of thin reflective film in a thin-film mirror.

Other objects and features of the invention will be in part apparent and in part pointed out hereinafter.

In accordance with the invention the support frame for the thin-film mirror includes a support housing in the form of a pan-shaped member. The pan-shaped support housing has a pan surface and a hollow wall joined to and surrounding the pan surface. Preferably the hollow wall and the pan surface of the pan-shaped support housing are formed as a one-piece integral molded structure.

The hollow wall of the pan-shaped support housing has a top mounting surface portion, stepped above the pan surface, that defines a film contact surface or film mounting surface for a thin reflecting film.

The pan-shaped support housing can be of any geometric shape such as circular, elliptical, or polygonal but is preferably trapezoidal in shape, which includes two acute corner angles and two obtuse corner angles. Preferably the film mounting surface at each of the acute corner angles has a fillet that makes an obtuse angle with the intersecting side wall portions of the hollow wall.

Under this arrangement the film mounting surface at all four corners of the pan-shaped support housing does not have any acute corner angles even though the sidewalls intersect at acute angles at two of the corners of the trapezoidal housing. Consequently when the thin reflecting film is bonded to the film mounting surface of the pan-shaped support housing and spans the pan surface there is substantially no wrinkling of the thin reflecting film at any corners of the film, which correspond to-the-corners of the pan-shaped support housing.

The elimination of film wrinkles at the corners of the thin reflecting film ensures that the optical reflecting area of the thin reflecting film is also free of any wrinkles.

The pan-shaped housing, whether circular, elliptical or polygonal, also includes a flange on an outside wall portion of the hollow wall, at an open bottom portion of the hollow wall. The flange extends away from the outside wall portion in a direction substantially parallel to the film mounting surface.

The hollow wall with the open bottom portion is U-shaped in cross-section and defines a U-shaped well. A one-piece reinforcing member is disposed in the U-shaped well to stiffen the pan-shaped housing. The reinforcing member can be of any hollow tubular configuration but is preferably channel shaped in cross-section and formed from a suitable elongated rigid channel shaped material.

For the preferred trapezoidal shape of the reinforcing member, straight slits are provided at three spaced locations between end portions of an elongated channel member of predetermined length. The slits permit folding of the elongated channel member into a trapezoidal shape of the reinforcing member that corresponds to the trapezoidal shape of the U-shaped well of the pan-shaped support housing.

Each of the three members of the thin-film mirror, namely the pan-shaped support housing, the reinforcing member and the thin reflecting film, in combination form a relatively stiff, rigid, lightweight, monocoque construction that provides a stable flat reflecting surface when the mirror is mounted to a mirror support structure. The thin reflecting film helps rigidify the mirror assembly since the thin film is adhered at its periphery to the peripheral film mounting surface of the pan-shaped support housing. The thin reflective film is thus supported in a substantially flat, distortion free plane and is substantially wrinkle free at the corners and at the optical reflecting area.

In another embodiment of the invention the trapezoidal pan-shaped support housing is formed without corner fillets. Circular and elliptical shaped embodiments of the invention also do not have fillets.

The invention also includes a method of substantially eliminating wrinkling of the thin reflective film in a thin-film mirror. The method includes forming a pan-shaped support housing with a pan surface and an integral hollow U-shaped peripheral wall surrounding the pan surface. The method further includes forming the hollow U-shaped wall with an open bottom portion proximate the pan surface and a top film mounting surface that is stepped away from the pan surface. The method also includes securing a one-piece reinforcing member in the hollow space or well of the U-shaped wall to rigidify the pan-shaped housing, and bonding a thin reflecting film on the film mounting surface such that the thin reflecting film spans the pan surface.

The method additionally includes forming the hollow wall of the pan-shaped support housing in the circular, elliptical or polygonal shape. The method further includes forming the pan-shaped support housing in the shape of a four-sided polygon with two acute corner angles, and forming a fillet as a portion of the U-shaped wall, at each of the acute corner angles, such that the fillet fills in a vertex portion of the acute corner angle.

Under this arrangement the fillet provides a fillet surface that is coplanar and continuous with the film mounting portion of the U-shaped wall. The method additionally includes forming the fillet with an inner wall that makes an obtuse angle with the U-shaped wall portions that otherwise intersect at an acute angle.

The invention accordingly comprises the constructions and methods hereinafter described, the scope of the invention being indicated in the claims.

DESCRIPTION OF THE DRAWINGS

In the drawings,

FIG. 4 is a front perspective view of the support frame thereof, without the thin reflecting film;

FIG. 5 is an enlarged fragmentary perspective detail of a corner of the support frame;

FIG. 8 is an exploded perspective view of the back portion thereof;

FIG. 9 is a plan view of the back portion thereof in assembled condition;

FIG. 10 is a side view thereof, from the left side of FIG. 9;

FIG. 12 is a perspective view of an unfolded reinforcing member for the thin-film mirror;

FIG. 13 is a perspective view thereof in folded arrangement;

Corresponding reference numbers indicate corresponding parts throughout the several views of the drawings.

DETAILED DESCRIPTION OF THE INVENTION

Figure 1:
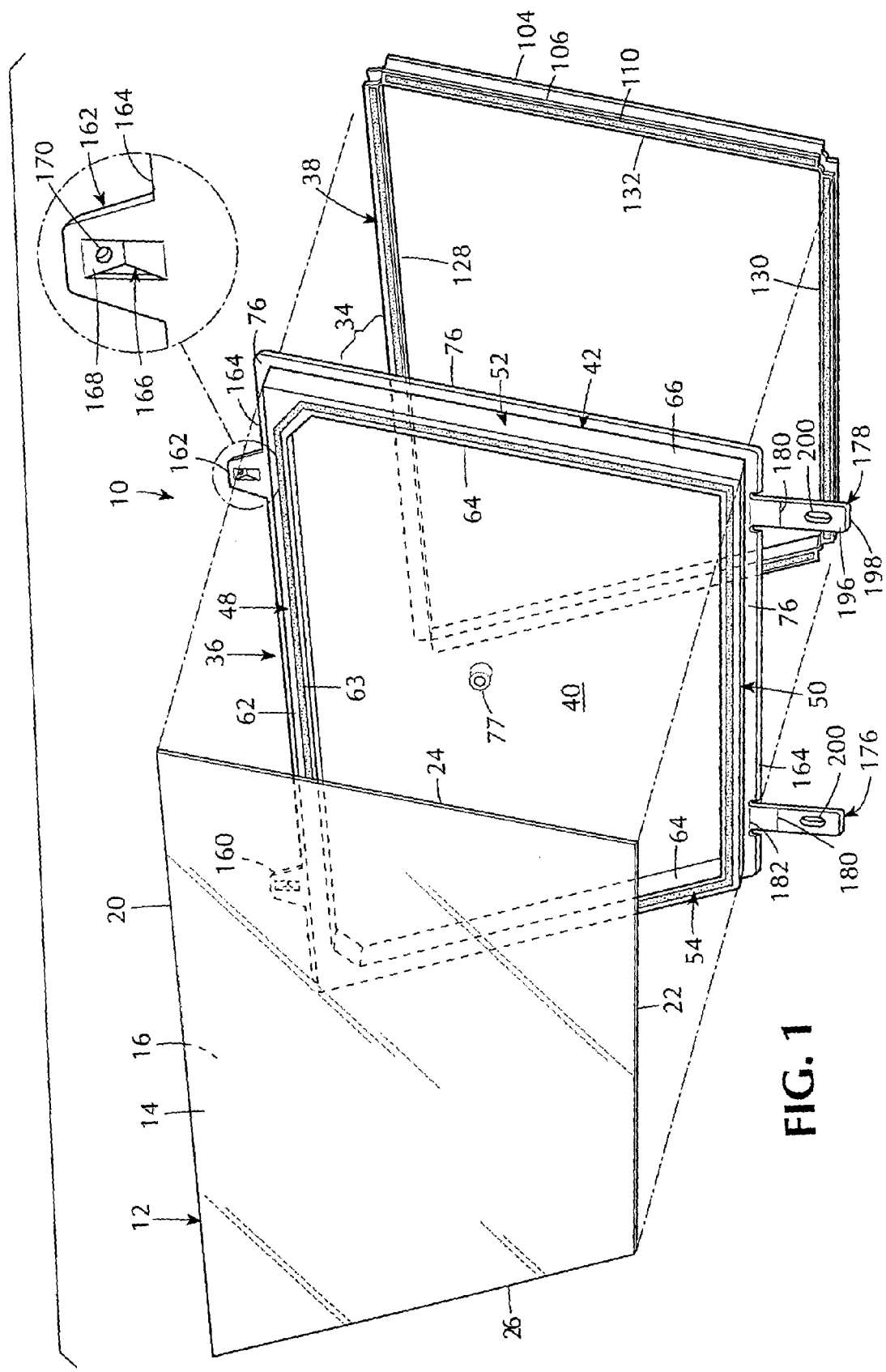
FIG. 1 is an exploded perspective view of the front portion of a thin-film mirror incorporating one embodiment of the invention.

A thin-film mirror incorporating a preferred embodiment of the invention is generally indicated by the reference number 10 in FIG. 1.

Figure 3:
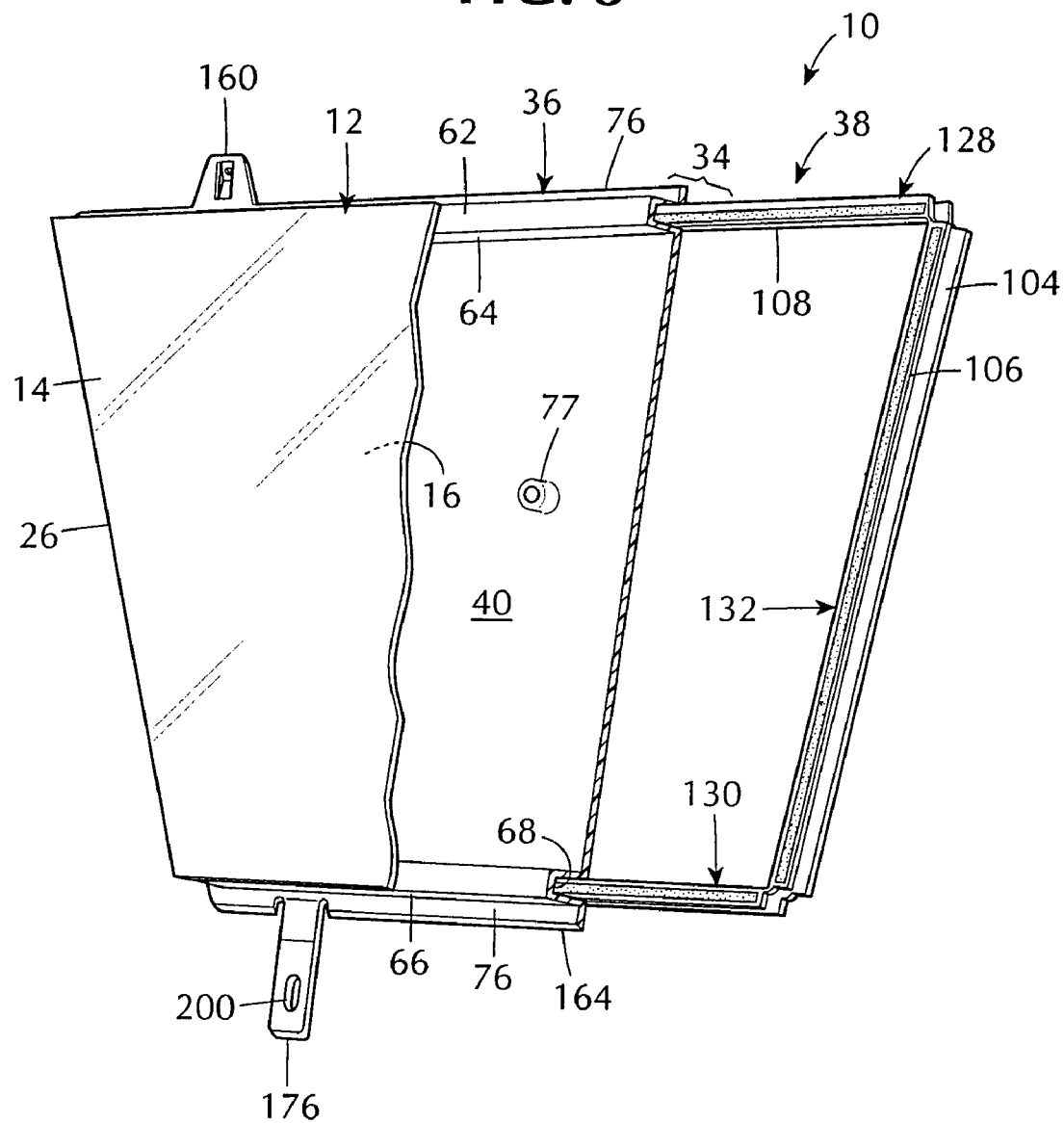
FIG. 3 is a cut-away perspective assembly view thereof.

The thin-film mirror 10, also referred to as the mirror 10, includes a known thin reflecting film 12 (FIG. 1) with a reflecting surface 14 and a non-reflecting surface 16. The thin reflecting film 12 has the shape of a polygon, preferably a trapezoid, with parallel edge portions 20, 22 and inclined edge portions 24 and 26. The edge portions 20, 22, 24 and 26 of the reflecting film 12 are adhered at the non-reflective surface 16 to a support frame 34 (FIG. 3).

Figure 2:
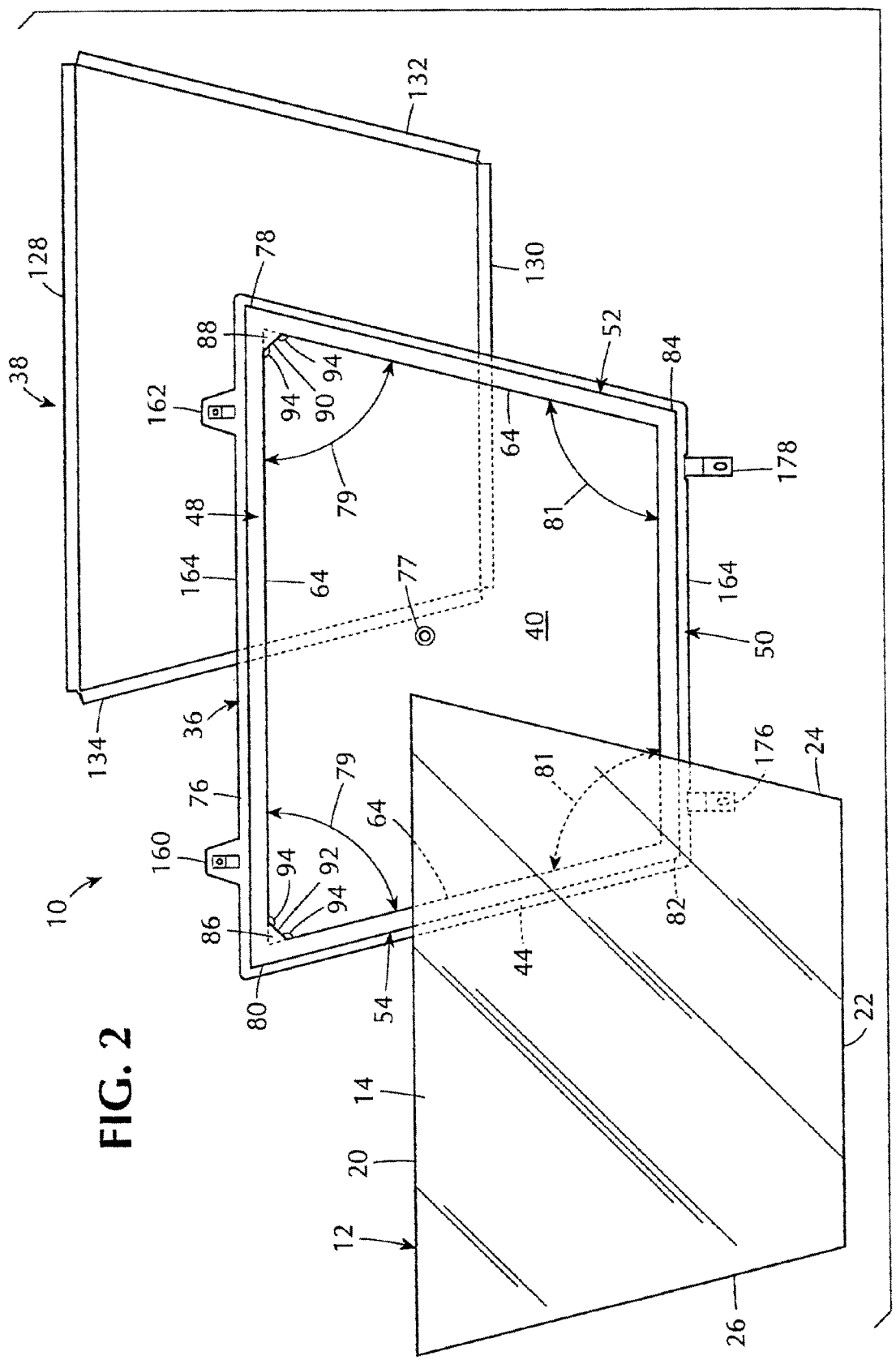
FIG. 2 is an exploded plan view of the front portion thereof.

The support frame 34 (FIG. 3) includes a four-sided, miterless, one-piece molded housing 36 (FIGS. 1, 4 and 8) preferably formed of plastic and also referred to as the pan-shaped housing 36. The support frame 34 further includes a peripheral reinforcing member 38 (FIGS. 1, 8 and 13) for the pan-shaped housing 36. The pan-shaped housing 36 and the reinforcing member 38 have a trapezoidal periphery corresponding to the trapezoidal periphery of the thin reflecting film 12. The pan-shaped housing 36 also includes a generally flat pan surface 40 (FIG. 4) surrounded by a hollow wall 42 with four sides 48, 50, 52 and 54 corresponding to the edge portions 20, 22, 24 and 26 of the thin reflecting film 12 (FIGS. 1 and 2).

The hollow wall 42 (FIG. 4) also has a trapezoidal periphery with an open bottom portion 56 (FIG. 6) proximate the pan surface 40. The hollow wall 42 is U-shaped in cross-section (FIG. 1) and has a top mounting surface portion 62 (FIGS. 3, 4 and 6) that is stepped above the pan surface 40. The top mounting surface portion 62 is substantially parallel to the pan surface 40 and defines a film-mounting surface for adherence of the edge portions 20, 22, 24 and 26 of the thin reflecting film: 12. The top mounting surface portion 62 is also referred to as the film mounting surface 62. A suitable known adhesive 63. (FIG. 1), applied in a continuous path on the film mounting surface 62, is used to secure the thin reflecting film 12 to the pan-shaped housing 36.

The hollow wall 42 (FIGS. 3 and 4) includes spaced inside and outside wall portions 64 and 66 (FIG. 11) that diverge slightly from the top mounting surface portion 62 (FIG. 6) of the hollow wall 42 in a direction toward the pan surface 40. The inside and outside wall portions 64 and 66 and the top mounting surface portion 62 of the side wall portions 48, 50, 52 and 54 form a continuous U-shaped channel or well 68 (FIGS. 3 and 6) into which the reinforcing member 38 is secured (FIG. 5).

A peripheral outwardly extending flange 76 (FIGS. 1–5) extends away from the outside wall portions 66 of the sidewalls 48, 50, 52 and 54 in a direction parallel to the top mounting surface portion 62 of the hollow wall 42.

The pan-shaped housing 36 (FIGS. 1–5 and 8) includes a vent port 77 to ensure that there is no pressure difference in the space between the thin reflecting film 12 and the pan-shaped housing 36, and the outside environment. The pan-shaped housing 36 is preferably vacuum or pressure molded in one-piece from a sheet of suitable plastic material such as ABS styrene, which can be approximately 0.050 inches thick.

Referring to FIGS. 2 and 4, the upper parallel sidewall 48 of the hollow-wall 42 intersects the inclined sidewalls 52 and 54 at an acute angle 79 (FIG. 2), at respective corners 78 and 80 of the hollow wall 42. The inclined sidewalls 52 and 54 of the hollow wall 42 also intersect with the bottom parallel sidewall 50 at an obtuse angle 81 (FIG. 2) at respective corners 82 and 84 of the hollow wall 42.

Also referring to FIGS. 2 and 4, it will be noted that the hollow wall 42 at each of the two corners 78 and 80 includes hollow fillets 86 and 88. The fillets 86 and 88, which are indicated by imaginary dotted lines in FIGS. 2 and 4, respectively include inside fillet walls 90 and 92 (FIG. 2). The inside fillet walls 90 and 92 (FIG. 2) intersect the inside wall portion 64 of the sidewalls 48 and 52, and 48 and 54, at obtuse angles 94. The fillets 86 and 88 (FIG. 4) provide additional film mounting surface area at the acute angle corners 78 and 80. The additional film mounting surface area is shown as triangular film-mounting surfaces 96 and 98 (FIG. 4) at the corners 78 and 80. The triangular film mounting surfaces 96 and 98 are continuous and coplanar with the film mounting surface 62.

The triangular film mounting surfaces 96 and 98 (FIG. 4) of the fillets 86 and 88 thus fill in a portion of the apex of the acute corner angle 79 (FIG. 2) at the corners 78 and 80 to provide an enhanced film mounting surface at the corners 78 and 80. The enhanced film mounting surface is a combination of the film mounting surface 62 and the triangular film mounting surfaces 96 and 98 of the fillets 86 and 88. The fillets 86 and 88 thus bridge a portion of the apex opening or apex gap of the acute angles 79 at the acute angle corners 78 and 80 of the film mounting surface 62 (FIG. 2). The fillets 86 and 88 also provide dual obtuse angles 94, 94 (FIG. 2) at the inside fillet walls 90 and 92 where such fillet walls 90 and 92 intersect the inside wall 64 of the sidewall portions 52 and 48, and 54 and 48.

The fillets 86 and 88 at the acute angle corners 78 and 80 convert the acute corner angle gap at the mounting surface 62 to a corner mounting surface having dual obtuse angles 94, 94. The film mounting surface 62 with the dual obtuse angles 94, 94 at the acute angle corners 78 and 80 supports the thin reflecting film 12 in a manner that permits substantial elimination of wrinkling of the thin reflecting film 12 mounted at the corners 78 and 80. Substantial elimination of film wrinkles at the acute angle corners 78 and 80 helps ensure that there will be no film wrinkling at the optical reflection area of the thin reflecting film 12 that spans the pan surface 40.

The trapezoidal reinforcing member 38 (FIGS. 12 and 13), is accommodated in the U-shaped channel 68 (FIGS. 3, 5 and 11) of the pan-shaped housing 36 and is also U-shaped in cross-section with two spaced and parallel leg portions 104 and 106 (FIG. 13) joined by a web portion 108. An adhesive 110 (FIG. 1) applied to the leg 106, or applied to an undersurface 111 (FIG. 5) of the U-shaped channel 68, secures the reinforcing member 38 within the U-shaped channel 68.

The reinforcing member 38 (FIG. 13) is formed as a one-piece member from a suitable rigid material such as steel, aluminum or fiber reinforced plastic. Preferably the reinforcing member is made using a rolled steel or aluminum channel. An elongated channel piece 38A (FIG. 12) of predetermined length is provided with notches 112 at three spaced locations that define corners 114, 116 and 118 (FIG. 13). The channel piece 38A also includes opposite ends 120, 120 that define a corner 122.

The notches 112 (FIG. 12) extend from the free ends of the channel legs 104 and 106 down to the web portion 108. The web portion 108 includes a slight scoreline or groove (not shown) to facilitate folding of the channel piece 38A to the trapezoidal form of the reinforcing member 38 as shown in FIG. 13. The channel piece 38A (FIG. 12) is folded at the notches 112 to form side portions 128, 130, 132 and 134 of a trapezoid that correspond to the trapezoidal wall portions 48, 50, 52 and 54 of the hollow wall 42 (FIG. 1). The free ends 120 (FIG. 12) are joined together in any suitable known manner to fix the trapezoidal shape of the reinforcing member 38 (FIG. 13).

It should be noted that the molded one-piece support housing 36 (FIGS. 1–4), which is miterless and free of any corner gaps or steps, is relatively lightweight and slightly rigid. The trapezoidal reinforcing member 38 is relatively rigid compared to the pan-shaped support housing 36. Installation of the reinforcing member 38 in the U-shaped channel 68 of the pan-shaped housing 36 provides a relatively stiff and rigid support frame 34 for the thin reflective film 12. The rigidity of the support frame 34 is enhanced by adherence of the thin reflecting film 12 to the film mounting surface 62 of the pan-shaped support housing 36.

The component parts of the thin-film mirror 10 including the thin reflecting film 12, the pan-shaped support housing 36 and the reinforcing member 38 thus constitute a lightweight, easy to assemble monocoque construction. The monocoque construction maintains the thin reflecting film 12 in a flat planar configuration that is substantially wrinkle free due to the absence of acute angles or steps at any corner of the film contact surface 62. The resulting monocoque construction thus provides a thin-film mirror 10 with a substantially distortion free reflecting surface 14.

Figure 6:
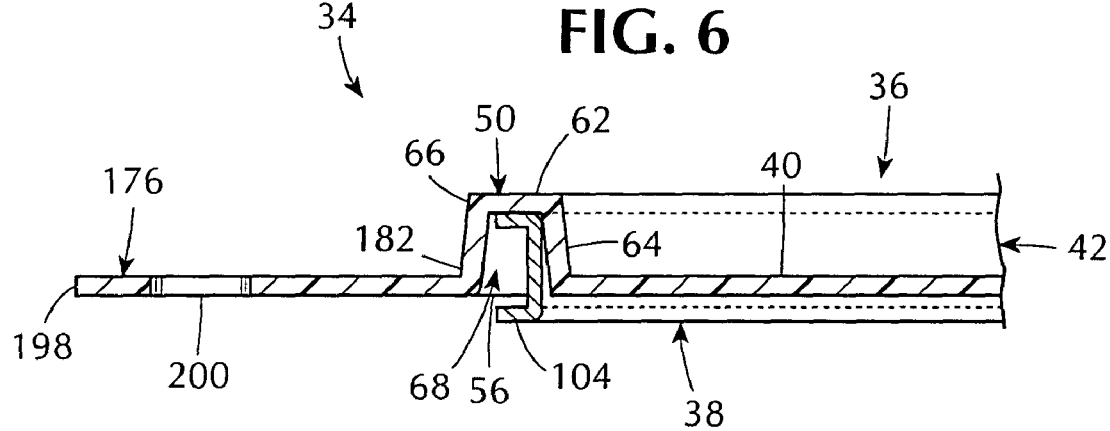
FIG. 6 is a sectional view taken on the line 6—6 of FIG. 4.
Figure 11:
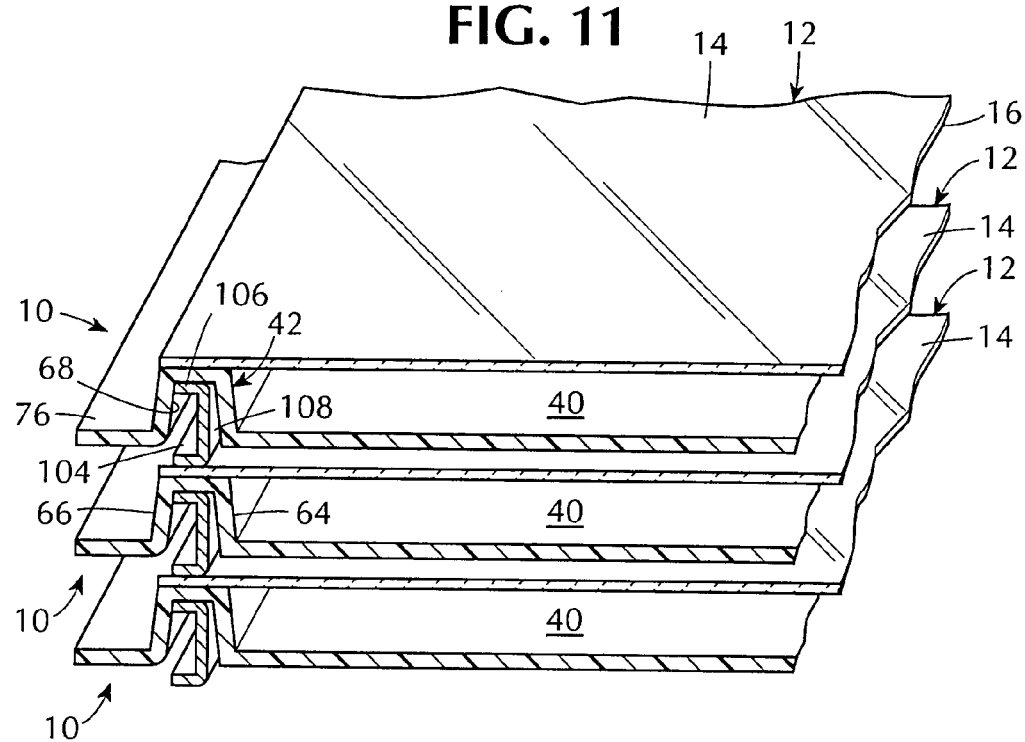
FIG. 11 is an enlarged fragmentary sectional view showing a stacking arrangement of several thin-film mirrors.

As most clearly shown in FIGS. 6 and 11 the distance between the channel legs 104 and 106 of the reinforcing member 38 is greater than the inside depth of the well 68 of the hollow wall 42. Thus the channel leg 104 will extend beyond the flange 76 (FIG. 11) and below the pan surface 40 of the pan-shaped housing member 36. The channel leg 104 (FIG. 13) at each of the four sides 128, 130, 132 and 134 of the reinforcement member 38 that extends beyond the flange 76 (FIG. 11) and the pan surface 40 can be characterized as an extended stacking leg.

The extended stacking leg 104 permits a plurality of thin-film mirrors 10 (FIG. 11) to be stacked one upon the other at the area where the thin reflective film 12 is supported on the mounting surface portion 62 of the mirror 10 as shown in FIG. 10. Under the stacking arrangement of FIG. 11 the stacking leg 104 of one thin-film mirror 10 can be seated on the pan-shaped housing 36 of another thin-film mirror 10 in alignment with the top mounting surface portion 62 of the other thin-film mirror 10 without damaging the thin reflecting film 12 of any of the stacked mirrors 10.

Thus the reinforcing member 38 also acts as a stacking foot that separates the unsupported portion of the thin reflective film 12 of an underlying mirror 10 from the pan surface 40 of an overlying mirror 10 in the stack of thin-film mirrors 10. The stacking of thin-film mirrors 10 one upon the other maintains the unsupported portion of the thin reflective film 12 that overlies the pan surface 40 of the pan-shaped housing 36 free from contact with any structure of an overlying mirror 10.

It has been found that fifteen to twenty thin-film mirrors 10 can be conveniently packed in a shipping box (not shown) in the stacked arrangement shown in FIG. 11 without damaging the reflecting film surface 14 of any of the stacked mirrors 10.

The thin-film mirror 10 also includes suspension means for supporting the mirror 10 in a desired position. For example two identical spaced suspension portions 160 and 162 (FIGS. 1, 2 and 8) are formed integrally with the flange 76 at the upper sidewall 48 and extend slightly beyond a free edge 164 (FIG. 1) of the flange 76. The suspension portions 160 and 162 each include a V-shaped hanger 166 (FIGS. 1 and 8), with one leg 168 having a fastener opening 170. The V-shaped hanger 166 is suitable for suspending the mirror 10 in a rear projection TV cabinet (not shown). The suspension portions 160 and 162 do not interfere with the stacking arrangement (FIG. 11) of the mirrors 10.

Figure 7:
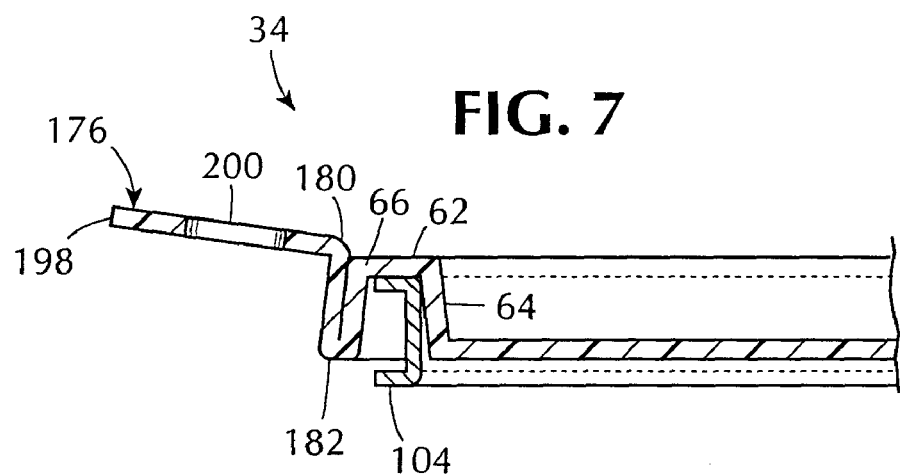
FIG. 7 is a sectional view taken on the line 7—7 of FIG. 4.

Two additional identical spaced suspension portions 176 and 178 (FIGS. 1, 2, 8 and 9) can also be formed integrally with the flange 76 at the lower sidewall 50 and extend beyond the free edge 164 of the flange 76. The suspension portions 176 and 178 include two spaced fold lines 180 and 182 (FIGS. 1, 7 and 8) which permit folding of the suspension portions 176 and 178 in the manner shown in FIG. 7.

A section 196 (FIGS. 1 and 8) of the suspension portions 176 and 178, between the fold line 180 and a free end 198, includes a fastener slot 200 for accommodation of a hanger fastener (not shown). The hanger fastener (not shown) in the fastener slot 200, when secured to a suitable support structure in a rear projection TV system for example, can maintain the folded suspension portions 176 and 178 (FIG. 7) in the folded condition of FIG. 7. If desired an adhesive or a fastener (not shown) can be used to maintain the suspension portions 176 and 178 in the folded condition of FIG. 7.

The precise dimensions of the thin-film mirror 10 may vary since the size of the mirror 10 is usually based upon the dimensional characteristics of a rear projection screen TV system in which a thin-film mirror may be disposed. Nevertheless to exemplify the magnitudes being dealt with, as disclosed in my provisional application, Ser. No. 60/413, 854, the disclosure of which is incorporated by reference herein, the upper parallel side 48 between opposite corners 78 and 80 of the flange 76 can be approximately 33 inches long. The lower parallel side 50 between opposite corners 82 and 84 of the flange 76 can be approximately 22 inches long. The distance between the upper and lower parallel sides 48 and 50 can be approximately 21 inches. The acute corner angles 79 (FIG. 2) at the corners 78 and 80 can be approximately 80 degrees and the obtuse corner angles 81 at the corners 82 and 84 can be approximately 100 degrees. The flange 76 can be approximately 0.30 inches wide all around except in the area of the suspension portions 160, 162, 176 and 178. The hollow wall 42 (FIG. 6) can have a height of approximately ¾ inch from the pan surface 40 to the mounting surface 62, and the mounting surface 62 can have a width of approximately ½ inch. The inside wall portion 64 and the outside wall portion 66 of the hollow wall 42 can have a draft angle of approximately 5 degrees. The fillet wall 92 (FIG. 2) of the fillet 86 is approximately 1½ inches from the corner 80 to the intersection of the fillet wall 92 with the inside wall portion 64 of the hollow wall 42. This dimension is also typical for the fillet 88 at the corner 78.

The reinforcing member 38 has a cross-sectional thickness of approximately 0.045 inches. The web portion 108 of the reinforcing member 38 is approximately 0.90 inches wide and the length of the channel legs 104 and 106 from the web 108 is approximately 0.40 inches.

Figure 14:
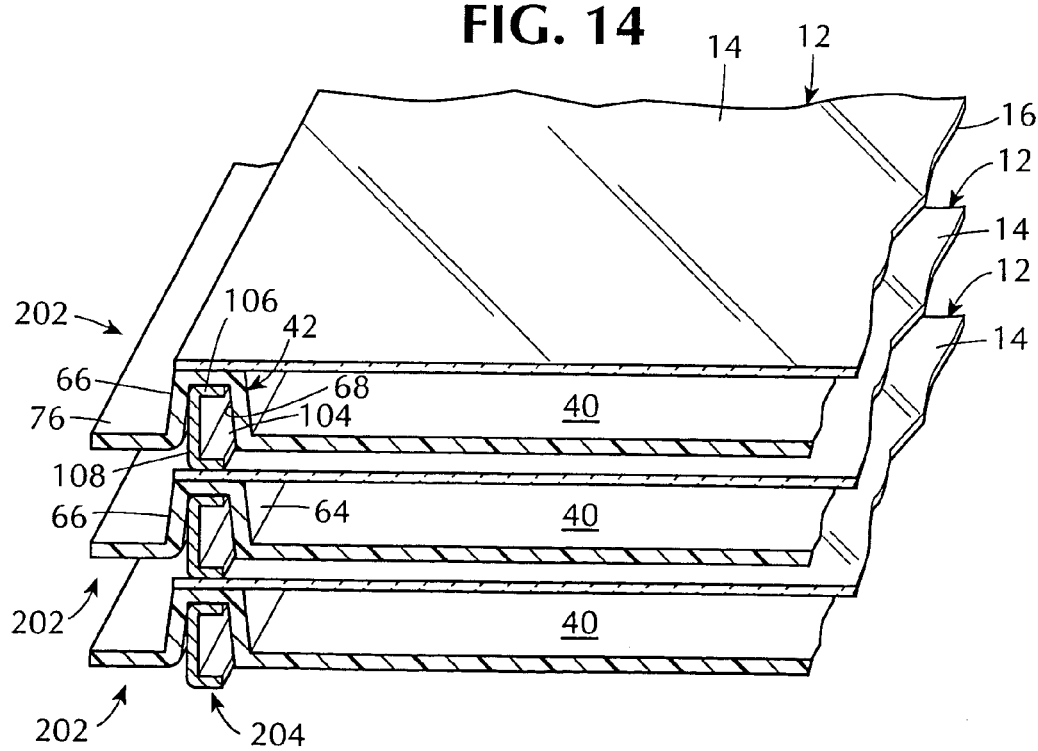
FIG. 14 is an enlarged fragmentary sectional view similar to FIG. 11 showing a stacking arrangement of several thin-film mirrors incorporating another embodiment of the invention.
Figure 15:
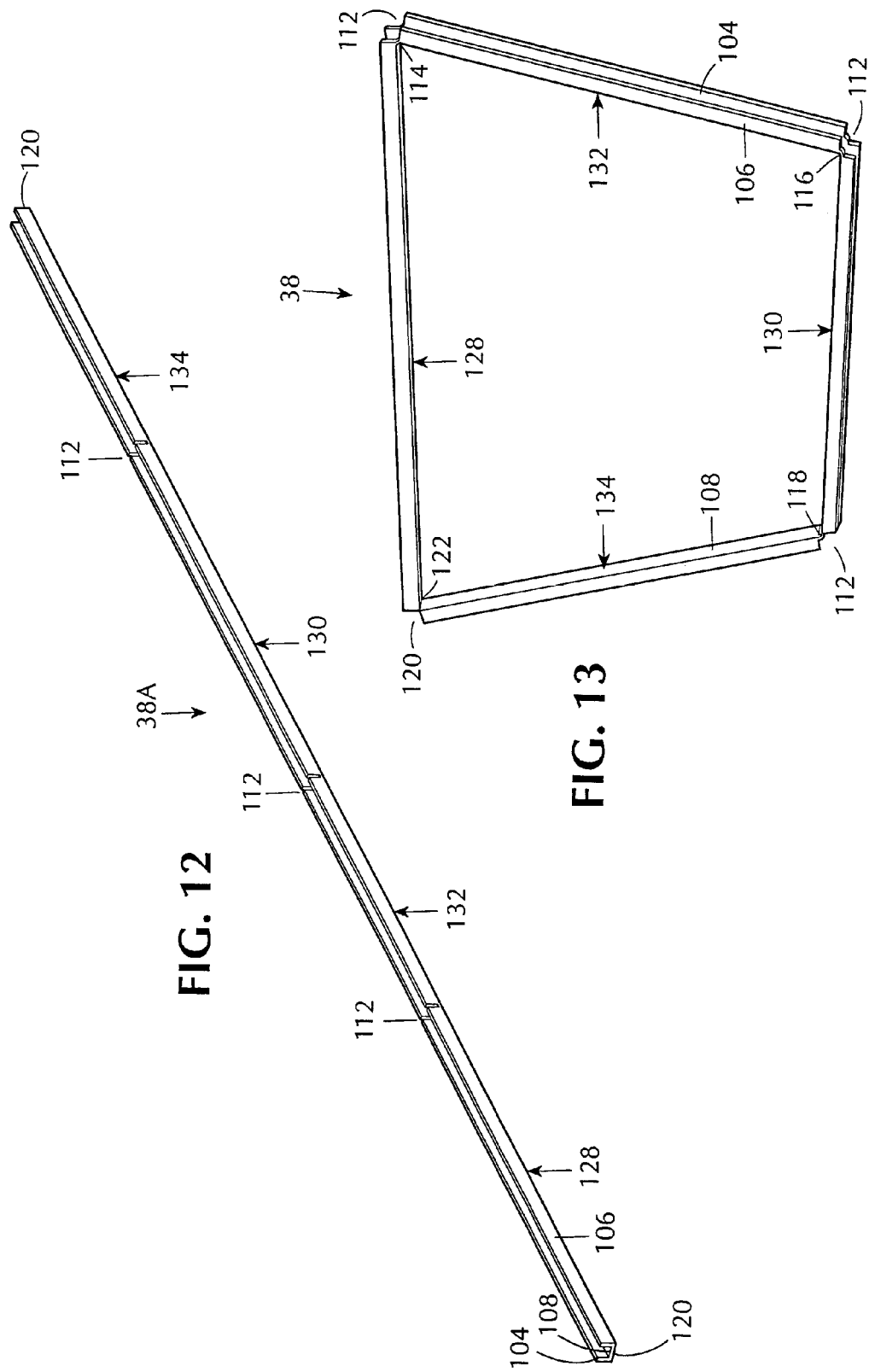
FIG. 15 is a perspective view of an unfolded reinforcing member for the embodiment of FIG. 14.
Figure 16:
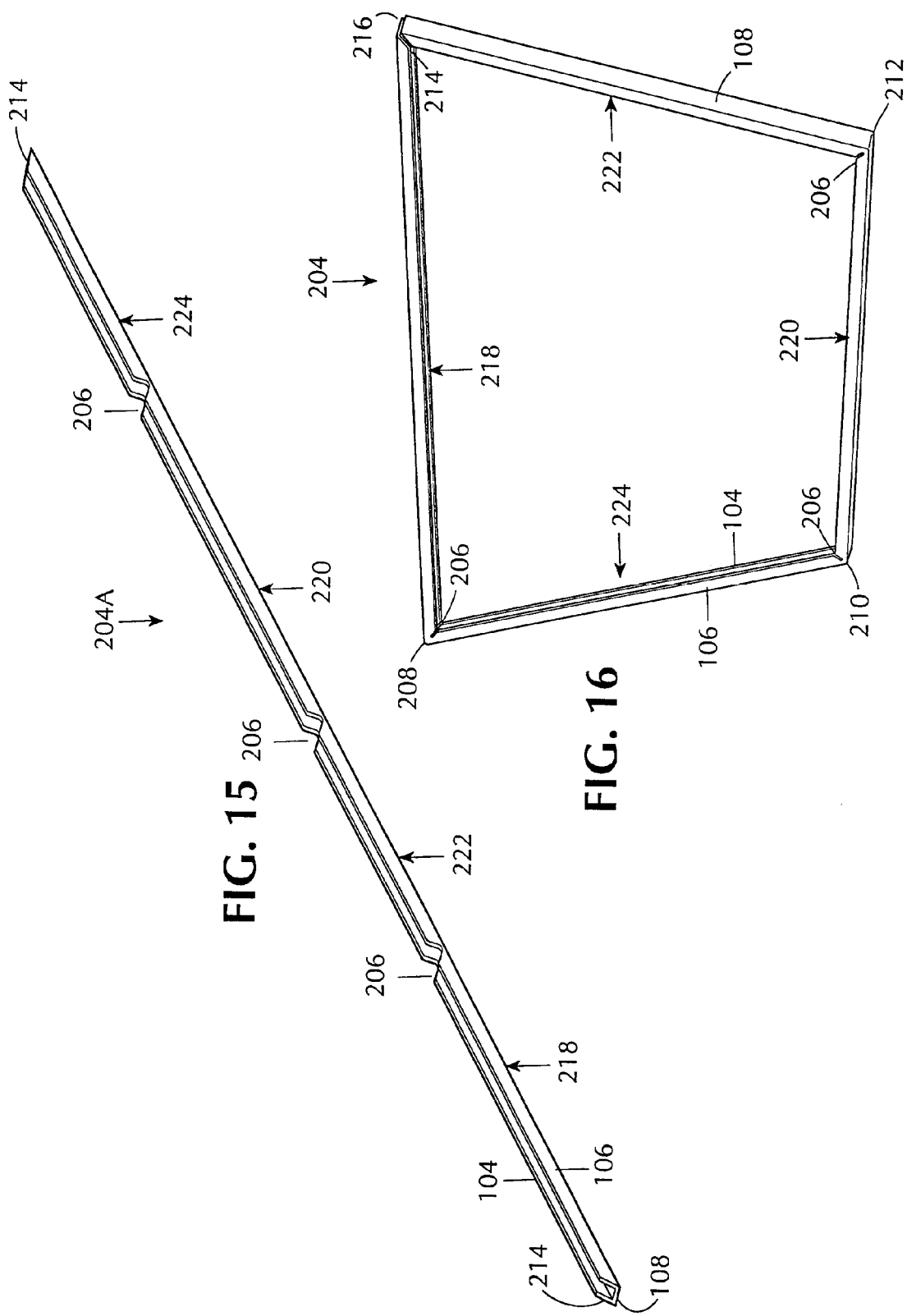
FIG. 16 is a perspective view thereof in folded arrangement.

Another embodiment of the thin-film mirror is generally indicated by the reference number 202 in FIG. 14. The thin-film mirror 202 includes a reinforcing member 204 (FIG. 16) formed from an elongated channel piece 204A (FIG. 15). The elongated channel piece 204A is provided with spaced miter notches 206 that extend from the free ends of the channel legs 104 and 106 down to the web portion 108 and define corner portions 208, 210 and 212 (FIG. 16). The web portion 108 includes a slight groove or scoreline (not shown) aligned with the miter notches 206 to facilitate folding of the channel piece 204A to the trapezoidal form of the reinforcing member 204 as shown in FIG. 16.

A full miter cut 214 (FIGS. 15 and 16) is provided at opposite ends of the channel piece 204A to define the corner portion 216. The reinforcing member 204 is thus folded at the miter notches 206 to form side portions 218, 220, 222 and 224 (FIG. 16) of a trapezoid that correspond to the trapezoidal hollow wall 42 of the pan-shaped housing 36.

The reinforcing member 204 is secured in the U-shaped channel 68 of the hollow wall 42 (FIG. 14) in a manner similar to that described for securing the reinforcing member 38 in the mirror 10. The web portion 108 (FIG. 14) is adjacent the outer wall 66, of the hollow wall 42, whereas in the thin-film mirror 10, the web portion 108 (FIG. 11) is adjacent the inner wall 64 of the hollow wall 42. The thin-film mirror 202 is otherwise identical to the thin-film mirror 10.

Figure 17:
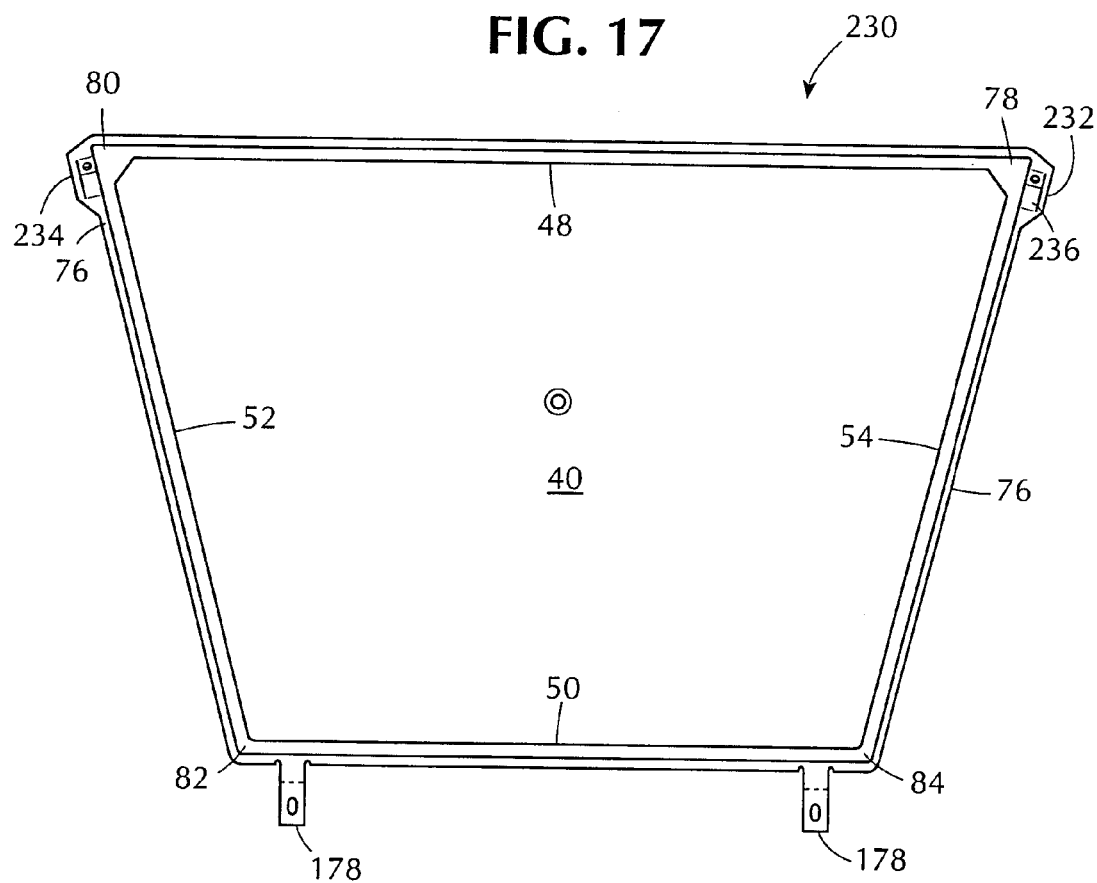
FIG. 17 is a front view of another embodiment of the invention without the thin reflecting mirror.
Figure 18:
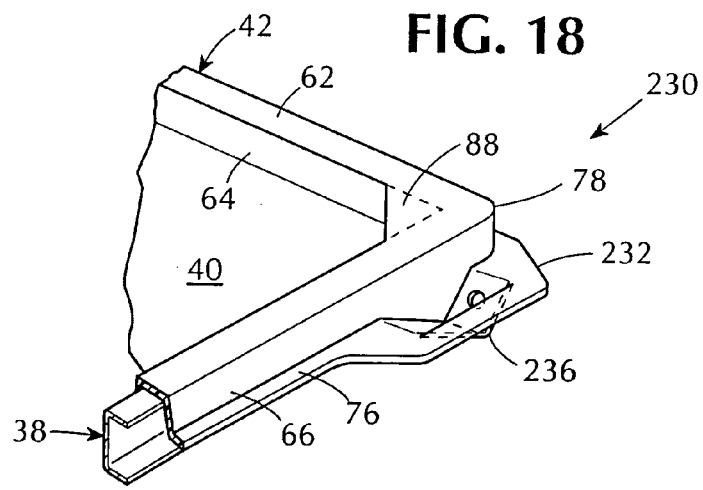
FIG. 18 is an enlarged fragmentary perspective detail of a corner portion of the embodiment of FIG. 17; and, FIGS. 19 and 20 are front views of further embodiments of the invention.

Another embodiment of the thin-film mirror is generally indicated by the reference number 230 in FIG. 17. The mirror 230 includes suspension portions 232 and 234 formed integrally with the flange 76 on the sidewalls 52 and 54 at the corners 78 and 80. Each suspension portion 232 and 234 includes a V-shaped hanger 236 similar to the V-shaped hanger 166 of the thin-film mirror 10. The thin-film mirror 230 is otherwise identical to the thin-film mirror 10.

Figure 19:
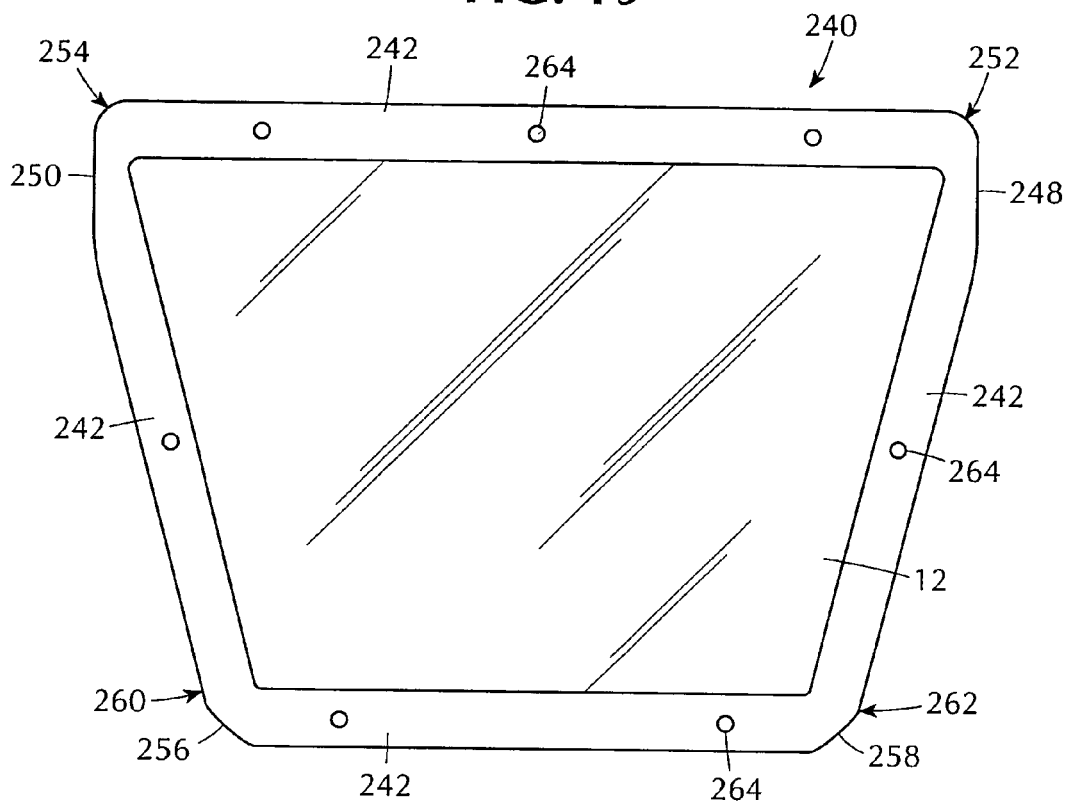

A further embodiment of the thin-film mirror is generally indicated by the reference number 240 in FIG. 19. The thin-film mirror 240 includes a relatively wide peripheral flange 242 analogous to the flange 76 of the thin-film mirror 10. The flange 242 includes parallel trim portions 248 and 250 at corners 252 and 254 and inclined trim portions 256 and 258 at corners 260 and 262.

Each side of the flange 242 includes a selected number of fastener holes 264. The thin-film mirror 240 is otherwise identical to the thin-film mirror 10.

Figure 20:
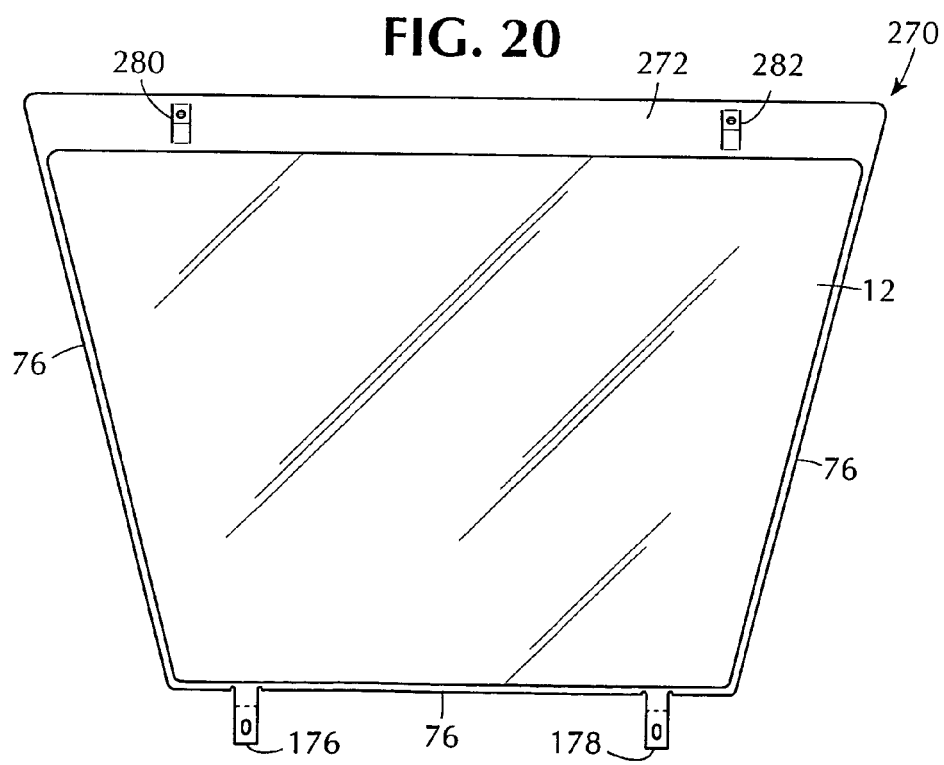

A further embodiment of the thin-film mirror is generally indicated by the reference number 270 in FIG. 20. The thin-film mirror 270 includes a relatively wide flange portion 272 at the upper side 274. The flange portion 272 includes a pair of suspension portions 280 and 282, identical to the suspension portions 160 and 162 of the mirror 10. The suspension portions 280 and 282 are integrally formed as a part of the flange 272. The thin-film mirror 270 is otherwise identical to the thin-film mirror 10.

While the preferred embodiment of the thin-film mirror is of trapezoidal shape it also contemplated that the thin-film mirror as disclosed herein can be made of circular, elliptical or polygonal shape other than a trapezoid.

In view of the above, it will be seen that the several objects of the invention are achieved and other advantageous results attained.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A support frame for a thin-film mirror comprising,
   a) a pan-shaped housing having a pan surface and a hollow wall joined to and surrounding the pan surface,
   b) the hollow wall having a top mounting surface portion for thin reflecting film, stepped above the pan surface,
   c) the pan-shaped housing member, including the hollow wall, having the shape of a polygon with the hollow wall having a predetermined number of sides intersecting at a corresponding said predetermined number of corners that define a corresponding said predetermined number of corner angles,
   d) at least one corner having a corner angle that is less than or equal to 90 degrees, and
   e) said hollow wall at said at least one corner having a fillet formed as a portion of said hollow wall, said fillet bordering the pan surface and making an obtuse angle with each of the intersecting wall portions at said at least one corner, and said fillet having a fillet top surface formed as a co-planar continuation of the top mounting surface portion of said hollow wall.

2. The support frame as claimed in claim 1 wherein the hollow wall, the fillet at said at least one corner angle and the pan surface are formed as a one-piece integral molded structure.

3. The support frame as claimed in claim 1 wherein the hollow wall has an open bottom portion opposite the top mounting surface portion.

4. The support frame as claimed in claim 3 wherein each of the predetermined number of sides of the hollow wall have spaced inside and outside wall portions, said pan-shaped housing further including a flange on the outside wall portions at the open bottom portion, said flange extending away from the outside wall portions in a direction substantially parallel to the top mounting surface portion of said hollow wall.

5. The support frame as claimed in claim 4 wherein said flange is formed with at least two suspension portions for accommodating fasteners for joining said thin film mirror to a support surface.

6. The support frame as claimed in claim 3 wherein each of the predetermined number of sides of the hollow wall have spaced inside and outside wall portions, the inside wall portion bordering the pan surface and the top mounting surface portion of the hollow wall, and the outside wall portion bordering the top mounting surface portion of the hollow wall.

7. The support frame as claimed in claim 3 wherein the hollow wall with the open bottom portion defines a U-shaped well and a reinforcing member having a size and shape corresponding to the shape of said hollow wall, is secured in said U-shaped well to rigidify said pan-shaped housing.

8. The support frame as claimed in claim 7 wherein the top mounting surface portion of said hollow wall has an undersurface within the U-shaped well, and the reinforcing member, in cross-section, has two spaced sides, the reinforcing member being positioned in the U-shaped well of the hollow wall such that one of the spaced sides makes surface contact with the undersurface of said hollow wall, and the other said spaced side extends a predetermined distance below the pan surface to form a stacking leg that permits stacking of thin film mirrors, wherein the stacking leg of one support frame can be seated on the pan-shaped housing member of another support frame in alignment with the top mounting surface portion of the other support frame.

9. The support frame as claimed in claim 8 wherein the reinforcing member is U-shaped in cross-section with a web portion joining the two spaced sides, and the hollow wall has spaced inside and outside wall portions, the inside wall portion bordering the pan surface, and the web portion of the reinforcing member is adjacent the inside wall portion.

10. The support frame as claimed in claim 8 wherein the reinforcing member is U-shaped in cross-section with a web portion joining the two spaced sides, and the hollow wall has spaced inside and outside wall portions, the inside wall portion bordering the pan surface, and the web portion of the reinforcing member is adjacent the outside wall portion.

11. The support frame as claimed in claim 2 wherein the pan-shaped member and the hollow wall have a trapezoidal perimeter, and two corner angles that are acute, and the hollow wall having one of said fillets at each corner having said acute corner angles.

12. The support frame as claimed in claim 1 wherein said hollow wall has spaced inside and outside wall portions and the fillet has an inside wall that makes an obtuse angle with the inside wall portions of the intersecting walls at said at least one corner.

13. The support frame as claimed in claim 1 wherein said hollow wall has an inside space and said fillet is hollow and has an inside space that communicates with the inside space of the hollow wall.

14. The support frame as claimed in claim 13 wherein the pan-shaped member and the hollow wall have a trapezoidal perimeter, and two corner angles that are acute, and the hollow wall having one of said fillets at each corner having said acute corner angles.

15. A support frame for a thin-film mirror comprising,
   a) a molded, plastic one-piece support housing of predetermined shape having a pan surface and side members surrounding the pan surface, each of the side members forming a hollow wall of U-shaped cross-section,
   b) the hollow wall having spaced inside and outside wall portions, and a film mounting surface portion for thin reflective film joining the spaced inside and outside wall portions, the film mounting surface portion being substantially parallel to the pan surface and being stepped away from the pan surface.

16. The support frame as claimed in claim 15 wherein the one-piece support housing including the hollow wall have a trapezoidal periphery, wherein said hollow wall has four sides intersecting at four corners that define four corner angles, two of the corner angles being acute angles.

17. The support frame as claimed in claim 15 wherein a flange is formed on the outside wall portions extending away from the outside wall portions in a direction substantially parallel to the film mounting surface portion.

18. The support frame as claimed in claim 16 wherein said hollow wall includes a fillet at two corners where the sides of the hollow wall intersect at acute angles, said fillet making an obtuse angle with the inside wall portions of the intersecting sides at each of the two corners with acute angles, said fillet being formed as a portion of said hollow wall and having a fillet surface that is a coplanar continuation of the film mounting surface portion of said hollow wall.

19. The support frame as claimed in claim 15 wherein the hollow wall defines a well and a reinforcing member of a size and shape corresponding to the hollow wall is secured in the well of the hollow wall to rigidify the hollow wall of said support housing.

20. The support frame as claimed in claim 19 wherein said one-piece support housing including the hollow wall have a trapezoidal periphery and said reinforcing member is a one-piece elongated member with opposite free end portions and three spaced notches between the free end portions that permit folding of said elongated member into the corresponding trapezoidal periphery of said hollow wall for securance in the well of said hollow wall.

21. A method of substantially eliminating wrinkling of thin reflective film in a thin film mirror comprising,
   a) molding a one-piece polygonal pan-shaped housing with a pan surface with a selected peripheral shape and side members surrounding the pan surface, with each of the side members being formed with a hollow U-shaped wall of corresponding peripheral shape,
   b) forming the hollow U-shaped wall with each of the side members having an open bottom portion proximate the pan surface and with a top mounting surface stepped away from the pan surface,
   c) forming a one-piece reinforcing member of a size and shape that corresponds to the selected peripheral shape of the hollow wall,
   d) securing the one-piece reinforcing member in the hollow space or well of the hollow wall to rigidify the pan-shaped housing and,
   e) bonding a thin reflecting film on the film mounting surface such that the thin reflecting film spans the pan surface.

22. The method of claim 21 including forming the hollow wall in the shape of a four-sided polygon with two acute corner angles.

23. The method of claim 22 including forming a fillet as a portion of the hollow U-shaped wall, at each of the two acute corner angles, such that the fillet fills in the vertex of the acute angle and providing a fillet surface for the fillet that is coplanar and continuous with the film mounting portion of the hollow wall and further providing an inner wall of the fillet that makes an obtuse angle with the hollow wall portions that intersect at an acute angle.

* * * * *